United States Patent
Taniguchi et al.

(10) Patent No.: US 11,851,788 B2
(45) Date of Patent: *Dec. 26, 2023

(54) COVER FABRIC AND A METHOD OF MANUFACTURING A VEHICLE SEAT COVER FABRIC

(71) Applicant: Lear Corporation, Southfield, MI (US)

(72) Inventors: Naoyuki Taniguchi, Tokyo (JP); Rose Morgan, Wilmington, NC (US)

(73) Assignee: LEAR CORPORATION, Southfield, MI (US)

( * ) Notice: Subject to any disclaimer, the term of this patent is extended or adjusted under 35 U.S.C. 154(b) by 602 days.

This patent is subject to a terminal disclaimer.

(21) Appl. No.: 17/002,245

(22) Filed: Aug. 25, 2020

(65) Prior Publication Data
US 2020/0385897 A1   Dec. 10, 2020

Related U.S. Application Data

(62) Division of application No. 15/705,969, filed on Sep. 15, 2017, now Pat. No. 10,753,015.

(51) Int. Cl.
*D03D 11/00* (2006.01)
*B60N 2/58* (2006.01)
(Continued)

(52) U.S. Cl.
CPC .......... *D03D 11/00* (2013.01); *B60N 2/5891* (2013.01); *D03D 1/00* (2013.01); *D03D 15/33* (2021.01);
(Continued)

(58) Field of Classification Search
CPC .......... D03D 11/00; D03D 1/00; D03D 15/33; B60N 2/5891; D04B 1/22; D04B 21/20;
(Continued)

(56) References Cited

U.S. PATENT DOCUMENTS 5,167,264 A   12/1992 Kalin
5,291,617 A * 3/1994 Moretz ............... B32B 5/26
                                                    2/403
(Continued)

FOREIGN PATENT DOCUMENTS

CN   103397427 A   11/2013
CN   103692714 A   4/2014
(Continued)

OTHER PUBLICATIONS https://www.textileschool.com/132/sheep-wool-natural-protein-fibers/ ; 2023 Textile school; accessed Mar. 27, 2023 (Year: 2023).*
(Continued)

*Primary Examiner* — Robert H Muromoto, Jr.
(74) *Attorney, Agent, or Firm* — Brooks Kushman P.C.

(57) ABSTRACT

A method of manufacturing a cover for a vehicle seat by weaving a first layer including a synthetic material, weaving a second layer including wool, and interweaving the first layer and the second layer with the second layer underling the first layer. The cover may include a woven top layer and a woven bottom layer, interwoven with the woven top layer. The woven top layer may include a plurality of first warp yarns and a plurality of first weft yarns. The woven bottom layer may include a plurality of second warp yarns and a plurality of second weft yarns. The plurality of second warp and weft yarns may include wool.

18 Claims, 3 Drawing Sheets

(51) Int. Cl.
*D03D 1/00* (2006.01)
*D04B 1/22* (2006.01)
*D04B 21/20* (2006.01)
*D03D 15/33* (2021.01)

(52) U.S. Cl.
CPC .............. *D04B 1/22* (2013.01); *D04B 21/20* (2013.01); *D10B 2211/02* (2013.01); *D10B 2403/0114* (2013.01); *D10B 2403/021* (2013.01); *D10B 2505/08* (2013.01); *D10B 2505/12* (2013.01)

(58) Field of Classification Search
CPC ........ D10B 2211/02; D10B 2403/0114; D10B 2403/021; D10B 2505/08; D10B 2505/12
See application file for complete search history.

(56) References Cited

U.S. PATENT DOCUMENTS

| | | | |
|---|---|---|---|
| 5,508,098 A | 4/1996 | Omar et al. | |
| 5,617,904 A * | 4/1997 | Kalin | D03D 15/56 442/209 |
| 5,666,691 A * | 9/1997 | Bealing | B60N 3/046 16/4 |
| 5,723,845 A * | 3/1998 | Partington | H05B 3/347 219/217 |
| 7,552,604 B1 * | 6/2009 | Waldrop | D04B 21/18 66/196 |
| 7,682,994 B2 * | 3/2010 | Van Emden | D03D 15/283 442/79 |
| 8,631,833 B2 | 1/2014 | Garbarino | |
| 10,753,015 B2 * | 8/2020 | Taniguchi | D04B 21/20 |
| 2004/0058102 A1 * | 3/2004 | Baychar | B32B 5/022 428/34.1 |
| 2005/0110315 A1 | 5/2005 | Littlehorn et al. | |
| 2008/0000013 A1 * | 1/2008 | Talley | A42B 1/0189 2/171 |
| 2008/0099278 A1 * | 5/2008 | Simon | B60R 13/0815 181/293 |
| 2008/0299854 A1 * | 12/2008 | Hilleary | D04B 21/16 442/314 |
| 2013/0276772 A1 | 10/2013 | Ota | |
| 2015/0360597 A1 * | 12/2015 | Galbreath | B60N 2/70 442/268 |
| 2019/0085489 A1 * | 3/2019 | Taniguchi | B60N 2/5891 |

FOREIGN PATENT DOCUMENTS

| | | |
|---|---|---|
| CN | 105908336 A | 8/2016 |
| DE | 103 18 126 A1 | 11/2004 |
| GB | 2 001 583 B | 4/1982 |
| JP | S6021944 | 2/1985 |
| JP | H04245951 | 9/1992 |
| JP | 2014505181 | 2/2014 |
| JP | 2017155374 | 9/2017 |
| WO | 2001044551 | 6/2001 |
| WO | 2007/107723 A1 | 9/2007 |

OTHER PUBLICATIONS

PCT International Search Report and Written Opinion of the International Searching Authority dated Nov. 15, 2018, Application No. PCT/US18/50986,11 Pages.

* cited by examiner

COVER FABRIC AND A METHOD OF MANUFACTURING A VEHICLE SEAT COVER FABRIC

REFERENCE TO RELATED APPLICATIONS

This application is a continuation of U.S. application Ser. No. 15/705,969 filed Sep. 15, 2017, now U.S. Pat. No. 10,753,015 issued Aug. 25, 2020, the disclosure of which is hereby incorporated in its entirety by reference herein.

TECHNICAL FIELD

The present invention relates to a method of interweaving a multi-layered fabric for a vehicle seat cover.

BACKGROUND

Most vehicle seats include an exterior covering, normally made of a cloth, leather, or some combination thereof. For example, a seat may be provided with a cloth covering made of a synthetic fiber such as polyester or a blend of polyester fibers. Polyester may be strong, wrinkle and tear-resistant, and fire resistant. But polyester may have poor moisture wicking properties, temperature stabilization, and may be less breathable than a wool or natural fiber material. For example, U.S. Pat. No. 6,151,926 discloses a seat fabric cover and a method of knitting the cover from yarn in generally a double jersey construction for covering a seat.

SUMMARY

According to one embodiment of this disclosure, a cover for a vehicle seat is provided. The cover may include a top layer that includes a synthetic material. The cover may also include a bottom layer that is connected to the top layer and include wool. The bottom layer of the cover for the vehicle seat may be configured to absorb moisture from the top layer.

According to another embodiment of this disclosure, a cover for a vehicle seat is provided. The cover may include a woven top layer and a woven bottom layer, interwoven with the woven top layer. The woven top layer may include a plurality of first warp yarns and a plurality of first weft yarns. The woven bottom layer may include a plurality of second warp yarns and a plurality of second weft yarns. The plurality of second warp yarns and the plurality of second weft yarns each include wool.

According to another embodiment of this disclosure, a woven fabric is provided. The woven fabric may include a top layer and a bottom layer. The top layer may include a first set of yarns and a second set of yarns and the bottom layer may include a third set of yarns and a fourth set of yarns. The top layer and the bottom layer may be interwoven with one another. The third set of yarns and the fourth set yarns may each comprise wool.

According to another embodiment of this disclosure, a method of producing a cover for a vehicle seat is provided. The method may include providing a first layer of synthetic yarns, providing a second layer including natural yarns, and weaving the first layer and the second layer such that the second layer underlies the first layer.

DETAILED DESCRIPTION

As required, detailed embodiments are disclosed herein; however, it is to be understood that the disclosed embodiments are merely exemplary and that various and alternative forms may be employed. The figures are not necessarily to scale; some features may be exaggerated or minimized to show details of particular components. Therefore, specific structural and functional details disclosed herein are not to be interpreted as limiting, but merely as a representative basis for teaching one skilled in the art.

Automotive seats often have an exterior covering that is attached to or disposed on the foam of the seat. The most common material used in vehicle seats is a synthetic fiber such as polyester or a polyester blend. The polyester blend may include polyester fibers blended with other fibers, such as other synthetic fibers and/or wool fibers, for example. Polyester fabrics may be highly stain resistant, so stain resistant that only certain types of dyes can be used to alter the color of polyester fabric. Additionally, the polyester or polyester blend material may be relatively strong and tear-resistant compared to natural fibers or wool fibers. But polyester has poor moisture wicking properties, temperature stabilization, and may be less breathable than a wool or natural fiber material. On the other hand, a material primarily comprised of wool may have excellent moisture absorbing properties and temperature stabilization. While wool may provide certain improved performance characteristics over synthetic or polyester fibers as already mentioned, it may be irritating to an occupant's skin and it may fade when subjected to various cleaners or a prolonged exposure to sunlight. The inventors have discovered that it may be advantageous to provide a material that includes a top layer comprising polyester and/or other synthetic material and that is connected to a bottom layer comprising wool.

Figure 1:
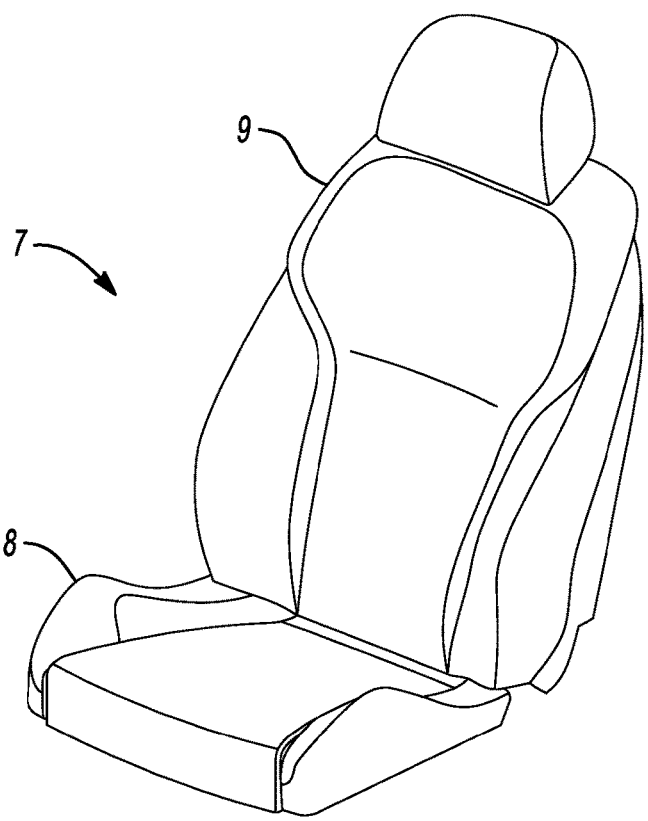
FIG. 1 is a perspective view of an exemplary vehicle seat having a seat cover.

Referring to FIG. 1, a perspective view of an example vehicle seat 7 is illustrated. The vehicle seat 7 may include a seat bottom or cushion 8 and a backrest 9. The vehicle seat 7 may include one or more woven or knitted covers that attach to, cover, and/or enclose, seat padding, such as foam, and support structure, such as metal structure (not illustrated) of the seat 7. For example, the cushion 8 and backrest 9 may each include a cover. Various example configurations of fabrics that may be used to form seat covers are discussed in greater detail below.

Figure 2:
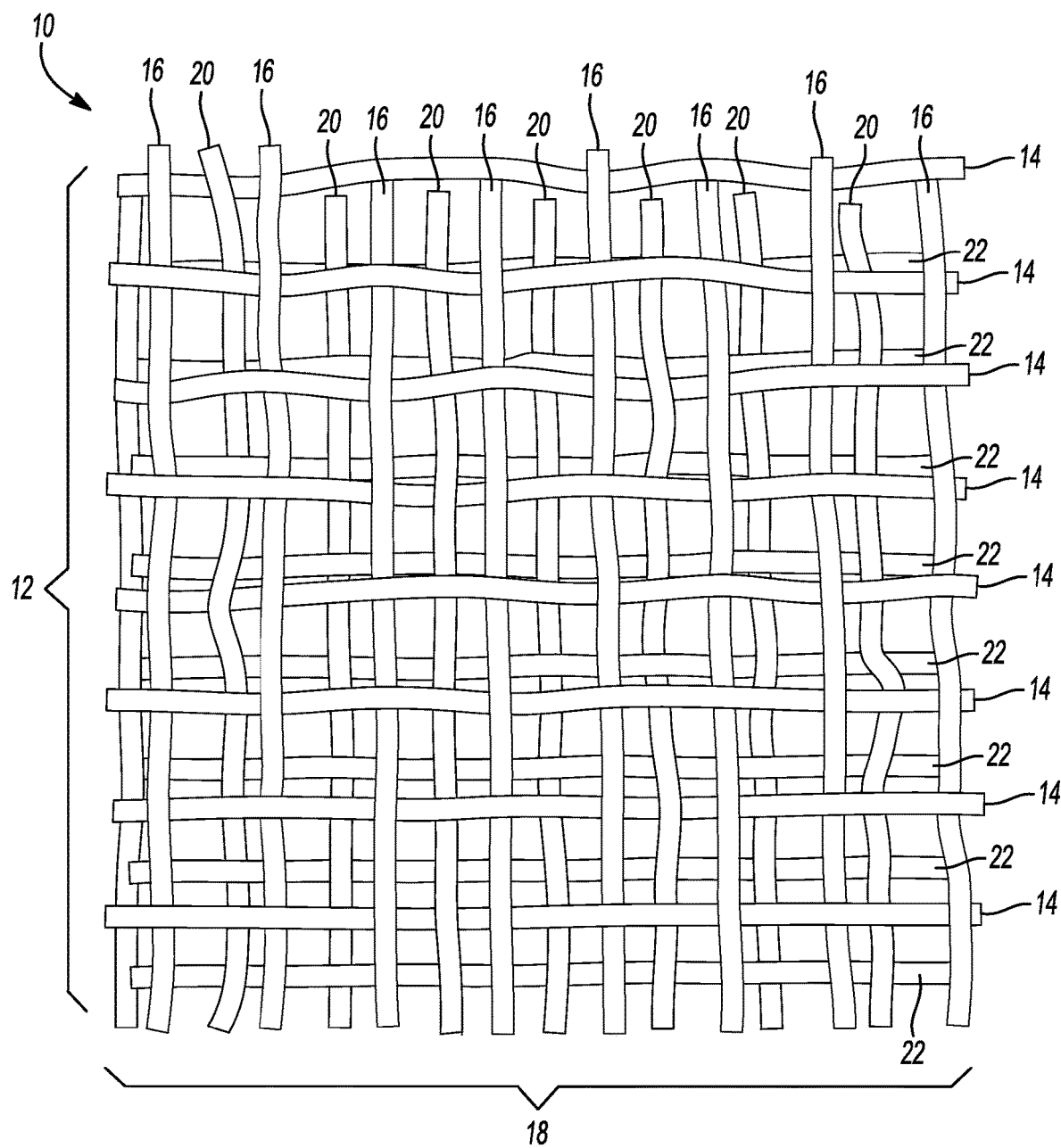
FIG. 2 is a top view of a woven fabric.

Referring to FIG. 2, a top view of an example weave 10 according to one embodiment of this disclosure is illustrated. The weave 10 includes a woven top layer 12, that may be comprised of yarns made of a synthetic material, and a woven bottom layer 18, that may be comprised of yarns that include wool material. For the purposes of this disclosure, the top layer is understood as the layer that forms the external surface of the seat, or a majority of the external surface of the seat. The external surface is configured to be adjacent to an occupant positioned on the seat. Because the top layer is woven with the bottom layer, some of the yarns of the top layer must extend to the bottom layer and vice-versa. Moreover, the term woven is understood as interlacing two or more threads so that they are connected to one another.

As was stated above, a synthetic material, e.g., polyester, generally has better color fastness and resistance to chemicals as compared to natural fibers. Therefore, it may be advantageous for the external surface defined by the top woven layer 12 of the weave 10 to include polyester and/or other synthetic fibers. The woven bottom layer 18, including at least some wool, may maintain the temperature of the cloth or weave 10 and absorb moisture better than the synthetic material of the top woven layer 12. Both the woven top layer 12 and the woven bottom layer 18 may be comprised of monolithic yarns, comprised of one material, or blended yarns, comprised of one or more materials. Regardless of whether the layers include monolithic yarns or blended yarns, the total composition of the top layer includes at least 90% synthetic material by weight and the woven bottom layer 18 includes at least 1% wool material by weight.

The top woven layer 12 includes first filling or weft yarns 14 and first warp yarns 16. The first filling or weft yarns 14 extend from the left side of the figure to the right side of the figure. The first warp yarns 16 extend from the bottom of the figure to the upper portion of the figure. The bottom woven layer 18 includes second filling or weft yarns 22 and second warp yarns 20. The second filling or weft 22 yarns may extend from the left side of the figure to the right side of the figure. The second warp yarns 20 may extend from the bottom of the figure to the top of the figure. The terms filling or weft generally refer to a thread or yarn that is positioned crosswise on a loom over and under the warp that extends lengthwise. Note that while the first warp yarns 16 and second warp yarns 20 are arranged orthogonally to the first filling or weft yarns 14 and the second filling or weft yarns 22, other configurations are possible. Moreover, the top woven layer 12 may be arranged along another angle, not shown, with respect to the bottom woven layer 18.

As was stated above, the first filling or weft yarns 14 and the first warp yarns 16 may be comprised of one material, or a blend of materials, or a combination thereof. Regardless of whether the first filling or weft yarns 14 and the first warp yarns 16 are each comprised of one material, a blend of materials, or some combination of materials, the material composition of the top woven layer 12 is comprised of at least 90% synthetic material or materials by weight. Synthetic materials may include, polyester nylon, rayon, among other materials. As one example, the first filling or weft yarns 14 and the first warp yarns 16 are each comprised of 100% polyester material or other synthetic material or materials. As another example, up to 10% of the top woven layer 12 may be comprised of a natural material or materials, with the balance being comprised of synthetic material or materials. As a more detailed example, 1% of the first filling or weft yarns 14 and the first warp yarns 16 may be comprised of a natural material with the balance being comprised of synthetic yarns.

As was stated above, the second filling or weft yarns 22 and second warp yarns 20 may be comprised of one material, or a blend of materials, or a combination thereof. Regardless of whether the second filling or weft yarns 22 and second warp yarns 20 are each comprised of one material, a blend of materials, or some combination of materials, the material composition of the bottom woven layer 18 includes at least 1% wool by weight, or in another embodiment at least 20% wool by weight, or in yet another embodiment at least 30% wool by weight. As an example, if 1% of the bottom woven layer 18 is comprised of wool by weight and the bottom woven layer includes one-hundred yarns, one of those yarns may be 100% wool and the remaining yarns may be comprised of synthetic or other natural yarns. Natural yarns may include silk, cotton, linen, or hemp, among other materials. As another example, if at least 33% of the bottom woven layer 18 is comprised of wool by weight and the bottom woven layer includes one-hundred blended yarns, each including three different strands of materials having the same weight, one of the strands may be made of 100% wool and the other two strands may be another natural or synthetic material. In one embodiment, one or more or all of the second warp yarns 20 and/or one or more or all of the second filling or weft yarns 22 each include at least 1% wool by weight. In another embodiment, all the second warp yarns 20 and/or one or more or all of the second filling or weft yarns 22 are made of 100% wool or other natural materials. Preferably the composition of the bottom woven layer 18 has a moisture absorption rate that is 40% greater than polyester or nylon.

Denier (d) is a unit of measurement for the thickness of the yarn. Fabrics with a high denier count tend to be thick, sturdy, and durable. Fabrics with a low denier count tend to be sheer, soft, and silky. As an example, a yarn having a thickness of 1 d has a mass of about 1 gram for 9,000 meters of yarn. To be considered a "microfiber" the fiber must be less than 1 denier, which is relatively fine. This makes the fabric very light and have a downy feel, and silky texture. In comparison, a human hair is 20 denier, whereas Standard Fiber's microfibers are typically 0.9 denier or less. The first filling or weft yarns 14 and first warp yarns 16 may have a thickness in the range of 75 d to 1200 d. The second warp yarns 20 and the second filling or weft yarns 22 may have a thickness in the range of 106 d to 900 d.

"Floats" of yarns refer to the presence of a synthetic yarn on the surface of the fabric over at least two intersections with other yarns comprising the fabric. In the context of this disclosure, a concentration of floats generates an asymmetric fabric surface that presents regions with a higher concentration of synthetic or polyester yarns on one side of the fabric, as compared to the wool or natural yarns, or vice versa. The floats can be concentrated across the whole fabric or only a portion of the fabric. The floats of the synthetic yarns provide the unique attributes associated with the synthetic yarns as previously mentioned. The pattern or arrangement of the weave 10 may take numerous patterns. When moving from the top-left area towards the top right of FIG. 2, the weave of the top surface or layer is arranged in the following pattern: 16, 20, 16, 14, 14, 14, 14, 14, 16, 14, 14, 14, 16, 14, 14. The consecutive yarns 14 positioned on the top layer 12 constitutes a float. This is just one example of a possible weave; numerous other patterns may be used. Therefore, although the bottom layer 18 is generally positioned under the top layer 12, some yarns of the bottom layer 18 may extend to the top surface of the weave 10 due to interweaving the layers 12 and 18 together. Likewise, some yarns of the top layer 12 may extend to a bottom surface of the weave 10 due to interweaving the layers 12 and 18 together.

Figure 3:
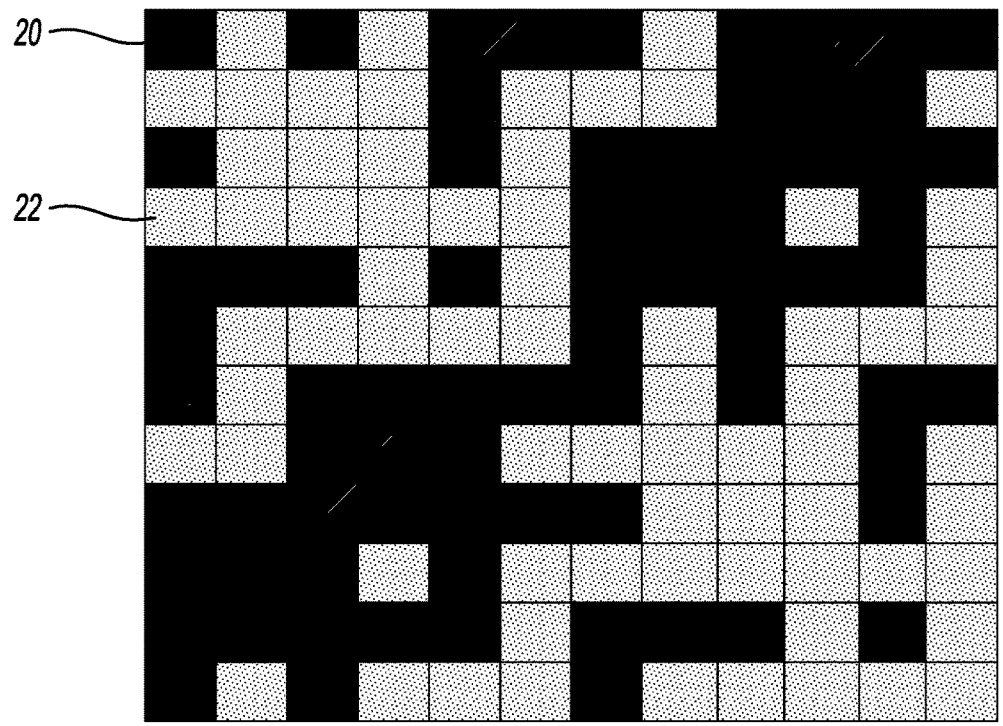
FIG. 3 depicts an exemplary unit cell of the weave.

Referring to FIG. 3, a unit cell of an exemplary weave construction is illustrated. The pattern in which the warp and weft yarns are interlaced is called the order of interlacing. Order of interlacing is a result of order of entering the warp and weft yarns through the weaving loom. The order of interlacing of a fabric is called the weave. The weave may be symbolically shown using a weave diagram or a unit cell. A square in the diagram represents the intersection of either one warp or one weft. A warp yarn placed over a weft yarn is represented by the square filled in black. A blank or white cell means that the warp yarn is under the weft yarn. For example, the square 20 filled in black in FIG. 3 is the first warp yarn over the first weft yarn, the cell 22 that is blank or white represents the second warp yarn being under the first weft yarn, and so on. The unit cell may represent the minimum number of warps and wefts needed to identify the woven structure completely. So, the unit cell may be repeated over and over until the entirety of the fabric is completed. Unit cells often have a ratio of warp to weft yarns. This particular unit cell includes 74 warp yarns to 70 weft yarns. As was previously mentioned, the unit cell in FIG. 3 is but one example of a weaving pattern and other configurations may be utilized.

In other embodiments, the top layer 12 and bottom layer 18 may have a knitted structure as opposed to an interwoven structure as previously described. A knitted fabric is made from one continuous thread that follows a meandering path or course, forming symmetric loops above and below the mean path of the yarn. These meandering loops may provide more elasticity allowing the fabric to be stretched in a longitudinal or a transverse direction, or both, as compared to a woven fabric. As one example, a knitted fabric may stretch as much as 500% from its un-stretched state.

Figure 4:
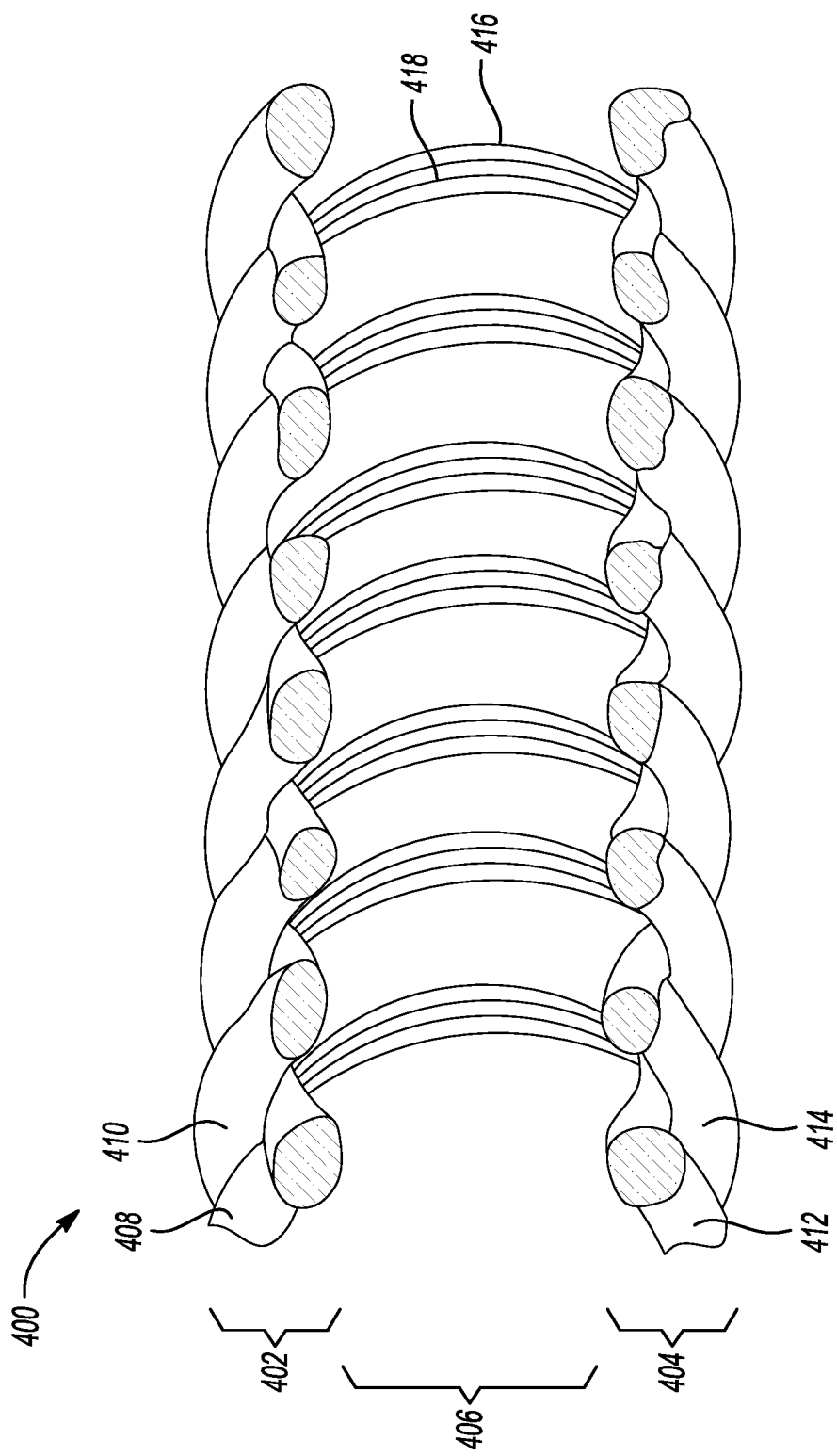
FIG. 4 is a cross sectional view of a fabric according to another embodiment of this disclosure.

FIG. 4 shows a cross sectional view of another embodiment of a fabric 400, according to the disclosure, for use with a seat cover. In the illustrated embodiment, the fabric 400 is a knitted fabric. The knitted fabric 400 includes a top layer 402 and a bottom layer 404 that is interknitted to the top layer 402 by a connecting layer 406. The top layer 402 is comprised of at least 90% synthetic material. The top layer 402 is composed of a plurality of knitted yarns 408 and 410. In one embodiment, the top layer may be made from 100% polyester or a polyester blended material, for example. The bottom layer 404 is comprised of at least 1% wool material. The bottom layer 404 is comprised of a plurality of knitted yarns 412 and 414 each of which may be made of 100% wool or a wool blended material, for example. The connecting layer 406 includes connecting yarns 416 and 418 that may extend in a perpendicular direction to the layers 402 and 404. However, the connecting yarns 416 and 418 need not extend in a perpendicular direction in other embodiments. The connecting layer 406 is comprised of at least 90% synthetic material.

The top layer 402 and the bottom layer 404 of the knitted fabric 400 may have various constructions, e.g. warp knitting or weft knitting. The weft knit construction often includes one yarn that is looped multiple times across the width of the fabric. Some weft knits may be produced with more than one yarn, often to produce various visual patterns of the yarns. If a single yarn is used in the weft knit fabric, the single yarn is fed into a knitting machine in a horizontal direction. Weft knit fabrics may be produced by a flat bed or circular knitting machine.

On the other hand, the top layer 402 and the bottom layer 404 of the knitted fabric 400 may each have a warp knit construction.

The knitted fabric may be produced by various methods. One such method is by processing the knitted fabric with a Double Needle Bar Raschel (DNBR). The DNBR machine uses two needle beds to create two fabrics that are joined together by interlacing filaments that make up yarns or by interlacing yarns themselves. A DNBR machine may include five to seven guide bars. In other embodiments, the knitted fabric may be produced by using a Tricot Machine.

Generally then, a fabric according to the disclosure, for use with a seat cover, may comprise a top layer including a synthetic material, and a bottom layer connected to the top layer and including wool. With such a configuration, the fabric may be relatively stain resistant, strong and tear-resistant based on the material of the top layer, for example, while also providing improved moisture wicking properties, temperature stabilization, and breathability based on the material of the bottom layer, for example.

While exemplary embodiments are described above, it is not intended that these embodiments describe all possible forms according to the disclosure. Rather, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A method of manufacturing a cover for a vehicle seat comprising:
   weaving a first layer forming an external surface of the vehicle seat that is attached to the seat to be contacted by an occupant positioned on the seat consisting of a synthetic material;
   weaving a second layer opposite the external surface of the top layer, the bottom layer including wool; and
   interweaving the first layer and the second layer such that the second layer underlies the first layer, wherein the second layer absorbs moisture from the first layer, and wherein the first layer and the second layer are interwoven with a portion of the yarn of the second layer extending into the first layer.

2. The method of claim 1 wherein weaving the first layer and weaving the second layer are performed simultaneously.

3. The method of claim 1 wherein the first layer consists of synthetic materials.

4. The method of claim 1 wherein the second layer includes wool.

5. The method of claim 1, wherein the second layer has a moisture absorption rate that is at least 40% greater than the moisture absorption rate of the first layer.

6. The method of claim 1, wherein the second layer has a moisture absorption rate of at least 8%.

7. The method of claim 1, wherein the first layer comprises a plurality of first warp yarns and a plurality of first weft yarns, arranged orthogonally to the plurality of first warp yarns, and the second layer comprises a plurality of second warp yarns and a plurality of second weft yarns, arranged orthogonally to the plurality of second warp yarns.

8. The method of claim 7 wherein the plurality of first warp yarns and the plurality of first weft yarns are arranged to be adjacent to an occupant when the cover is mounted on the vehicle seat and the occupant is positioned on the vehicle seat.

9. The method of claim 7 wherein the first layer comprises a series of microfiber threads.

10. A woven fabric comprising:
    an outer layer including a first set of yarns and a second set of yarns, wherein the first set of yarns and the second set of yarns consist essentially of a synthetic material the outer layer forming an external surface of a seat that is attached to the seat to the seat to be contacted by an occupant of the seat; and
    an inner layer underlying the outer layer and including a third set of yarns and a fourth set of yarns, wherein the outer layer and the inner layer are interwoven with one another, and wherein the third set of yarns and the fourth set of yarns each comprise wool, wherein the inner layer absorbs moisture from the outer layer, and wherein the outer layer and the inner layer are interwoven with a portion of the yarn of the inner layer extending into the outer layer.

11. The woven fabric of claim 10, wherein the first set of yarns are arranged along a first direction and the second set of yarns are arranged along a second direction and wherein the third set of yarns are arranged along a third direction and the fourth set of yarns are arranged along a fourth direction.

12. The woven fabric of claim 11, wherein the second direction is orthogonal to the first direction.

13. The woven fabric of claim 11, wherein the fourth direction is orthogonal to the third direction.

14. The woven fabric of claim 11, wherein the first set of yarns and the second set of yarns are arranged to be adjacent to an occupant when the woven fabric is mounted on a vehicle seat and the occupant is positioned on the vehicle seat.

15. The woven fabric of claim 11, wherein the third set of yarns and the fourth set of yarns comprise at least 1% wool material by weight.

16. The woven fabric of claim 11, wherein the first set of yarns and the second set of yarns each comprise at least 10% polyester material by weight.

17. The woven fabric of claim 11, wherein the third set of yarns and the fourth set of yarns have a moisture absorption rate that is at least 40% greater than the moisture absorption rate of the first set of yarns and the second set of yarns.

18. The woven fabric of claim 10, wherein the first set of yarns and the second set of yarns have a fiber thickness less than 8 denier.

* * * * *